United States Patent [19]
Falzon

[11] 3,779,098
[45] Dec. 18, 1973

[54] RIGHT HAND STEERING MECHANISM FOR VEHICLES

[76] Inventor: William Joseph Falzon, 9619 Stout, Detroit, Mich. 48228

[22] Filed: June 16, 1972

[21] Appl. No.: 263,549

[52] U.S. Cl. .................................. 74/492, 280/96
[51] Int. Cl. .............................................. B62d 1/18
[58] Field of Search ........................... 74/492, 493; 280/87 R, 96

[56] References Cited
UNITED STATES PATENTS

| | | | |
|---|---|---|---|
| 2,929,263 | 3/1960 | Felts | 74/493 |
| 3,480,291 | 11/1969 | Hilfiker | 74/492 X |
| 3,633,933 | 1/1972 | Millard | 280/96 |

*Primary Examiner*—Allan D. Herrmann
*Attorney*—Cullen, Settle, Sloman & Cantor

[57] ABSTRACT

A steering mechanism for automobiles. This mechanism consists primarily of a steering shaft on a right hand side of the automobile with shaft connecting means to a short steering column having trip lever means for enabling the column to go forward during the event of a collision, thus preventing serious injury to the driver of the automobile.

3 Claims, 2 Drawing Figures

PATENTED DEC 18 1973 3,779,098

RIGHT HAND STEERING MECHANISM FOR VEHICLES

This invention relates to automotive vehicles steering mechanisms, and more particularly to a right hand steering mechanism for a vehicle.

It is therefore the primary purpose of this invention to provide a steering mechanism for vehicles which will have a steering shaft on a right side of the vehicle, connected to its related components to steer the front wheels of the vehicle.

Another object of this invention is to provide a steering mechanism which will include a connecting shaft extending to the steering column of the vehicle, the steering column being short so as to reach only under the dashboard of the vehicle, leaving the floor board with the necessary pedals for controlling the vehicle, only.

A further object of this invention is to provide a mechanism of the type described, which will include a tapered steering column with trip lever means that will enable the column to move forward upon impact, thus preventing or lessening the injuries that may occur to the driver of the vehicle during a collision.

Other objects of the present invention are to provide a right hand steering mechanism for vehicles which is simple in design, inexpensive to manufacture, rugged in construction, easy to use and efficient in operation.

Figure 1:
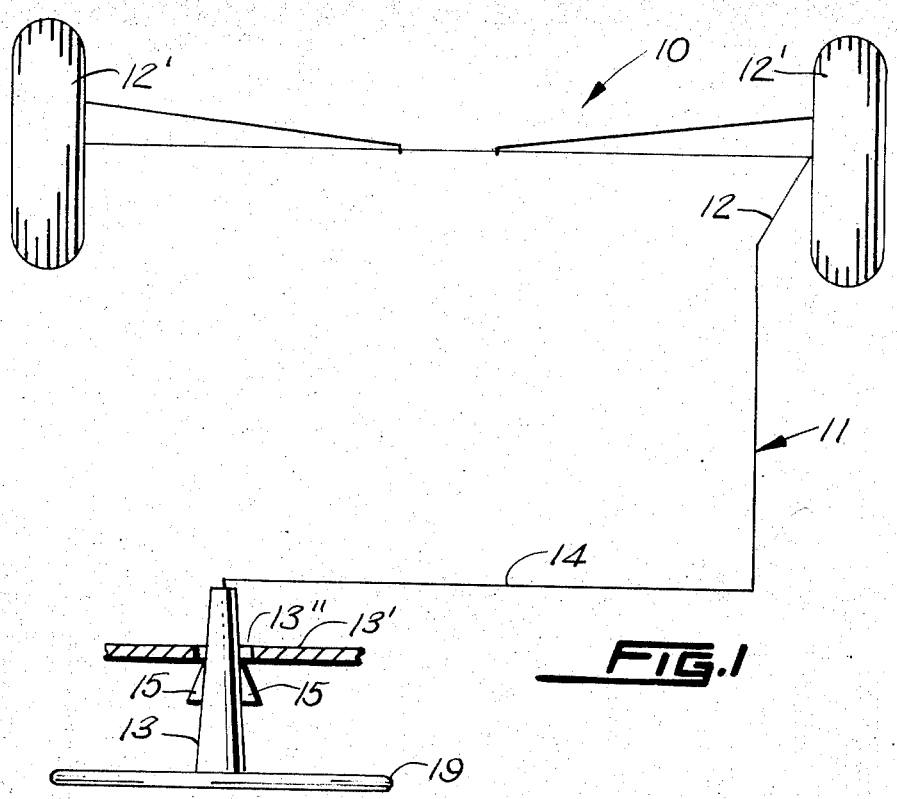
Figure 2:
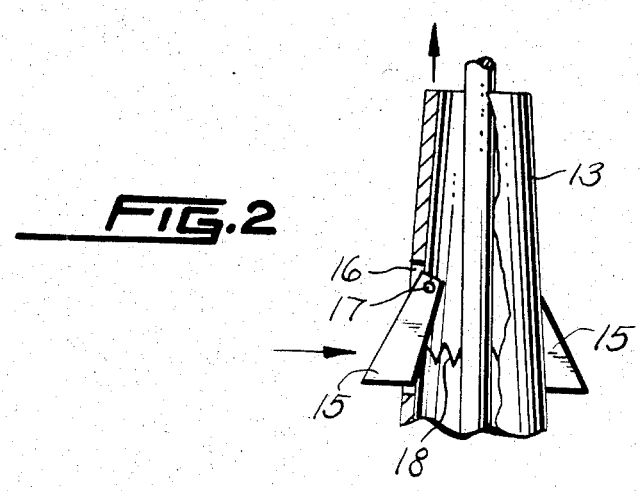

These and other objects will be readily evident upon a study of the following specification and the accompanying drawing wherein:

FIG. 1 is a diagramatic plan view of a vehicle steering system incorporating the present invention; and FIG. 2 is an enlarged fragmentary view of the steering column shown in FIG. 1.

According to this invention, a steering mechanism 10 is shown to include a right hand positioned steering shaft 11 connected to its associated components 12 at the forward end of the vehicle (not shown). Steering shaft 11 is secured to the steering column 13 in the mechanism, the steering column 13 being tapered and shorter in length than those of the prior art.

It will be noted that the steering column 13 is affixed, so as to reach or extend only under the dashboard 13', thus leaving the floor board with only the necessary pedals for control of the vehicle.

It shall further be noted that the steering shaft and its related shaft 14 of steering column 13 extend to the right of the vehicle for controlling of the front wheels 12'.

The steering column 13 is of such tapered cofiguration, so as to move forward into the opening 13'' of dashboard 13' upon impact of the vehicle and extending outwards in an oppositely opposed relationship, are trip levers 15 within the side opening 16 of column 13. Trip lever 15 is secured by pivot pins 17 within column 13 and are urged outwards by means of springs 18. The heretofore described arrangement of mechanism 10 is such, so as to enable the steering wheel 19 of column 13 to move forward during a collision so as to protect the driver from serious injury by the steering wheel 19 and the column 13.

In use, the steering column 13 and its associated steering wheel 19 will move forward upon impact and thus the trip lever 15 will be urged inwards of column 13, against the pressure of the springs 18.

What I now claim is:

1. A right side positioned steering mechanism for a motor vehicle having a dashboard, a steering wheel and connected shaft, comprising a steering shaft secured by its related components to the right steering portion of the front wheels;

a steering column mounted on and movably projected through the left side of the dashboard, supporting said steering wheel and receiving its shaft;

a second shaft at one end connected to said steering shaft, and at its other end connected to the steering wheel shaft;

a pair of trip levers carried by said steering column retainingly engaging the dashboard, spring means outwardly biasing said levers; said trip levers being movable inwardly providing a means for enabling said steering column to move forward into said dashboard upon impact to thus prevent serious injury to the driver of the vehicle.

2. In the steering mechanism of claim 1, said steering column being tapered; said trip levers being pivotally mounted within slots oppositely disposed in the wall of said steering column, said pivot mounting including pins secured within said steering column; said spring means including springs within said steering column oppositely disposed to each other with their one ends secured to said trip levers respectively and their opposite ends secured to the interior of said column.

3. In the steering mechanism of claim 1, wherein said steering column is carried within an opening in said dashboard so that when impact occurs, said steering wheel and shaft and associated steering column will move forward through the opening in said dashboard, causing said trip levers to be urged inward of said steering column so as not to obstruct the forward motion of said steering column and steering wheel.

* * * * *